(12) United States Patent
Buhlheller et al.

(10) Patent No.: US 8,084,978 B2
(45) Date of Patent: Dec. 27, 2011

(54) ADJUSTING DEVICE AND CONTROL DEVICE OF A VEHICLE

(75) Inventors: Jürgen Buhlheller, Hainert (DE);
Markus Schüssler, Zeitlofs (DE);
Thomas Rösch, Querfurt (DE)

(73) Assignee: Brose Fahrzeugteile GmbH & Co., Coburg (DE)

( * ) Notice: Subject to any disclaimer, the term of this patent is extended or adjusted under 35 U.S.C. 154(b) by 682 days.

(21) Appl. No.: 12/092,442

(22) PCT Filed: Oct. 21, 2006

(86) PCT No.: PCT/EP2006/010165
§ 371 (c)(1),
(2), (4) Date: Jul. 28, 2008

(87) PCT Pub. No.: WO2007/051534
PCT Pub. Date: May 10, 2007

(65) Prior Publication Data
US 2008/0284362 A1    Nov. 20, 2008

(30) Foreign Application Priority Data
Nov. 4, 2005  (DE) .................. 20 2005 017 249 U

(51) Int. Cl.
*H02P 1/04* (2006.01)
*H02P 3/00* (2006.01)
(52) U.S. Cl. .................. 318/466; 318/266; 318/467
(58) Field of Classification Search ............ 318/34, 318/266, 286, 466, 467, 538, 445, 548; 388/800; 701/1; 280/735
See application file for complete search history.

(56) References Cited

U.S. PATENT DOCUMENTS

| | | | |
|---|---|---|---|
| 4,706,194 A * | 11/1987 | Webb et al. ................. | 701/49 |
| 5,670,853 A * | 9/1997 | Bauer ..................... | 318/286 |
| 6,590,354 B2 * | 7/2003 | Hein ...................... | 318/34 |
| 6,677,720 B2 * | 1/2004 | Fraser .................... | 318/445 |
| 6,731,088 B2 * | 5/2004 | Nivet ..................... | 318/548 |
| 7,053,575 B2 * | 5/2006 | Fukuhara et al. .......... | 318/538 |
| 7,346,272 B2 * | 3/2008 | Franzan .................. | 388/800 |
| 2004/0140783 A1 * | 7/2004 | Fukuhara et al. .......... | 318/467 |
| 2005/0200106 A1 * | 9/2005 | Hirose et al. ............ | 280/735 |
| 2007/0003258 A1 * | 1/2007 | Franzan .................. | 388/803 |
| 2007/0050096 A1 * | 3/2007 | Mattes et al. ............ | 701/1 |
| 2007/0052273 A1 * | 3/2007 | Satta et al. ............. | 297/378.12 |
| 2007/0106429 A1 * | 5/2007 | Endo et al. .............. | 701/1 |
| 2010/0032999 A1 * | 2/2010 | Petitpierre .............. | 297/217.4 |

FOREIGN PATENT DOCUMENTS
WO    WO 03/002256    1/2003
* cited by examiner

*Primary Examiner* — Paul Ip
(74) *Attorney, Agent, or Firm* — Scott T. Weingaertner; Joseph D. Eng, Jr.; King & Spalding LLP

(57) ABSTRACT

The invention relates to a control device of a vehicle seat for controlling a first drive and a second drive and for detecting jamming of a body part or of an object by means of an adjusting movement of an adjusting part, which can be adjusted in a first adjusting direction by means of the first drive and in a second adjusting direction by means of the second drive, of the vehicle seat, wherein the control device is configured to detect the jamming by means of a combined evaluation of at least one first force variable which is dependent on the adjusting movement and of a second force variable which is dependent on the adjusting movement.

17 Claims, 2 Drawing Sheets

ADJUSTING DEVICE AND CONTROL DEVICE OF A VEHICLE

FIELD OF THE INVENTION

The invention relates to an adjustment device and a control apparatus of a vehicle.

BACKGROUND OF THE INVENTION

Electric drive units are used in many application areas for implementing activation processes of moving parts which are carried out by means of external force. For example, various movable parts (adjustment parts, actuating elements) are activated in seats in vehicles by means of electric drive units, (e.g., seat length adjustment, seat backrest adjustment, seat depth adjustment, seat height adjustment, etc.). The electric drive units have an electric motor (for example, a DC motor) for generating and making available electric drive power, a gear mechanism for transmitting the movement of the electric motor, a device for mechanically coupling or adapting the electric motor or gear mechanism to the movable part (adjustment part, actuating element), in particular for converting the rotational movement of the electric motor into a linear movement, and an electronic motor for actuating and monitoring the electric motor (for example for performing closed-loop control of the rotational speed and power of the electric motor).

The drive force that is required for the electric drive unit is generally between 100 N and 1000 N. In order to increase the comfort for the user or operator, the activation processes which are carried out by means of external force (by electric motor) can often be carried out automatically: the user or operator then simply has to initiate the deactivation process and can dedicate himself to other activities during the (fully) automatically occurring activation process. However, in the case of activation processes which occur automatically, in particular in the case of automatically occurring activation processes which are not monitored further by the user or operator or are triggered by the user or operator from a relatively large distance (by remote control), there is the risk of body parts or objects becoming trapped. Such automatic adjustment processes can, for example, be initiated when a key for calling a stored position is activated so that the electric drive units automatically move the adjustment parts which are to be adjusted (backrest, seat cushion, head rest, etc.) of the vehicle seat into the previously stored position.

Document DE 196 38 781 A1 presents an actuating drive with anti-trapping protection. In order to implement an anti-trapping protection, direct methods or indirect methods can be used: in direct methods of the activation travel which is carried out by the movable part is self-monitored for potential obstacles (for example by providing switching strips or by optical means), which, however, entails high costs and is susceptible to faults; in indirect methods, the trapping force which is produced when trapping occurs is monitored in that trapping is assumed to be occurring if a predefined limiting value (triggering threshold value) for the drive force (starting from a certain excess force) is exceeded; after trapping has been detected, specific measures are initiated, in particular the electric drive unit (the electric motor) can be reversed or switched off.

The trapping force or excess force which is evaluated in the indirect methods for providing anti-trapping protection can either be determined directly (which is extremely costly owing to the sensors, for example force sensors or torque sensors, which are required for this purpose), or indirectly by sensing and evaluating the measured values of at least one engine characteristic variable that is characteristic of the loading of the electric motor or of the torque that is currently output by the electric motor (for example by evaluating the drive speed and/or current drain and/or power drain and/or energy consumption of the electric motor), i.e., by evaluating the recovery of the trapping force to the electric motor of the electric drive unit (change of the drive load).

In this indirect determination of the trapping force, DE 44 42 1 71 A1 discloses that in order to monitor a system with an electromotive drive the frictional force of the drive is taken into account. The frictional force is detected at a time at which trapping does not yet occur, and therefore no trapping force occurs, in which case the frictional force can be determined either indirectly from the motor characteristic variables of the motor current (armature current) and/or motor voltage and/or motor speed or directly by means of suitable sensors on the electric motor.

EP 1 299 782 B1 discloses a method for providing anti-trapping protection in which, in order to monitor the electric drive unit for potential trapping, friction force profiles are determined as a profile of the frictional force during the activation process (either by direct measurement of the forces or by indirect determination by reference to the motor characteristic variables of motor current and/or motor voltage and/or motor speed or period length). These frictional force profiles are placed in a relationship with one another by various successively occurring activation processes in the form of a quality measure; the proportion of the frictional force, and therefore of the trapping force, is sensed in such a way that the triggering threshold value is set to relatively low values as a function of this quality measure. The triggering threshold value can (depending on the quality measure) either be influenced here in a global fashion (independently of position, i.e., independently of the activation travel) or be adapted in a position-dependent fashion by taking into account the activation travel.

WO 02/15359 A1 discloses a method for performing open-loop and closed-loop control of an adjustment device which is driven by motor, in particular a seat adjustment means for a motor vehicle with anti-trapping protection. If a predefined load limit is exceeded, the motor drive is switched off or is adjusted by closed-loop control to a value below the load limit.

Input variables or state variables of the motor drive are acquired continuously. The current loading of the adjustment device or of the motor drive is determined from the state variables by means of a mathematical model of the drive.

By acquiring the relevant state variables of the adjustment device, the relationships between the respective components of the adjustment system are taken into account using the mathematical model of the adjustment device, permitting the trapping force to be calculated very precisely. The adjustment device is to be understood here as referring to all components of an adjustment system which are necessary to operate an adjustment device.

The state variables of the adjustment system are obtained, inter alia, from the changing environmental conditions such as temperature, moisture or pressure, a change in which entails a corresponding change in the adjustment force to be applied for the operation of the adjustment apparatus. The trapping force which can be tolerated at the respective time is determined by means of the adjustment force to be applied so that it is possible to react very precisely if a case of trapping occurs and the drive is to be stopped or reversed.

In this context, it is also possible by calculating the trapping force, by means of the mathematical model of the adjustment apparatus, to take into account influencing variables which cannot be acquired by sensors. It is therefore possible to take into account all the influencing variables or state variables of the system which are acquired in the model and, if appropriate, evaluate the effect on the entire system in terms of intensity.

SUMMARY OF THE INVENTION

The invention is based on the object of specifying an adjustment device with anti-trapping protection. This first object is achieved by means of an adjustment device comprising a first drive for adjusting an adjustment part, in particular a backrest, in a first adjustment direction, and a second drive for adjusting this adjustment part in a second adjustment direction. The adjustment device comprises an open-loop control apparatus for performing open-loop control of the first drive and of the second drive and for detecting trapping of a body part or of an object as a result of an adjustment movement of the adjustment part, which can be adjusted by the first drive and by the second drive. The adjustment device also comprises a first sensor means which is operatively connected to the first drive, and a second sensor means which is operatively connected to the second drive, wherein the open-loop control apparatus is connected to the first sensor means and to the second sensor means and is configured (1) to determine, as a function of a first sensor signal of the first sensor means and a second sensor signal of the second sensor means, a first force variable, which is dependent on the adjustment movement, and a second force variable, which is dependent on the adjustment movement, and (2) to detect the trapping by means of a combined evaluation of at least the first force variable and the second force variable.

The second object on which the invention is based is to specify an open-loop control apparatus of a vehicle with anti-trapping protection. The second object is achieved by means of an open-loop control apparatus of an adjustment device, in particular of a vehicle seat, for performing open-loop control of a first drive and of a second drive and for detecting trapping of a body part or of an object as a result of an adjustment movement of an adjustment part of the vehicle seat. The adjustment part can be adjusted in a first adjustment direction by the first drive and in a second adjustment direction by the second drive. The open-loop control apparatus is configured to detect the trapping by means of a combined evaluation of at least a first force variable, which is dependent on the adjustment movement, and a second force variable, which is dependent on the adjustment movement.

The third object on which the invention is to provide a method for detecting a case of trapping for an adjustment device. The method is useful for detecting trapping of a body part or of an object as a result of an adjustment movement of an adjustment part of an adjustment device of a motor vehicle, in particular of a vehicle seat, where the adjustment part can be adjusted in a first adjustment direction by a first drive and in a second adjustment direction by a second drive. The method comprises evaluating a first force variable, which is dependent on the adjustment movement, and a second force variable, which is dependent on the adjustment movement.

DETAILED DESCRIPTION OF THE INVENTION

Figure 1:
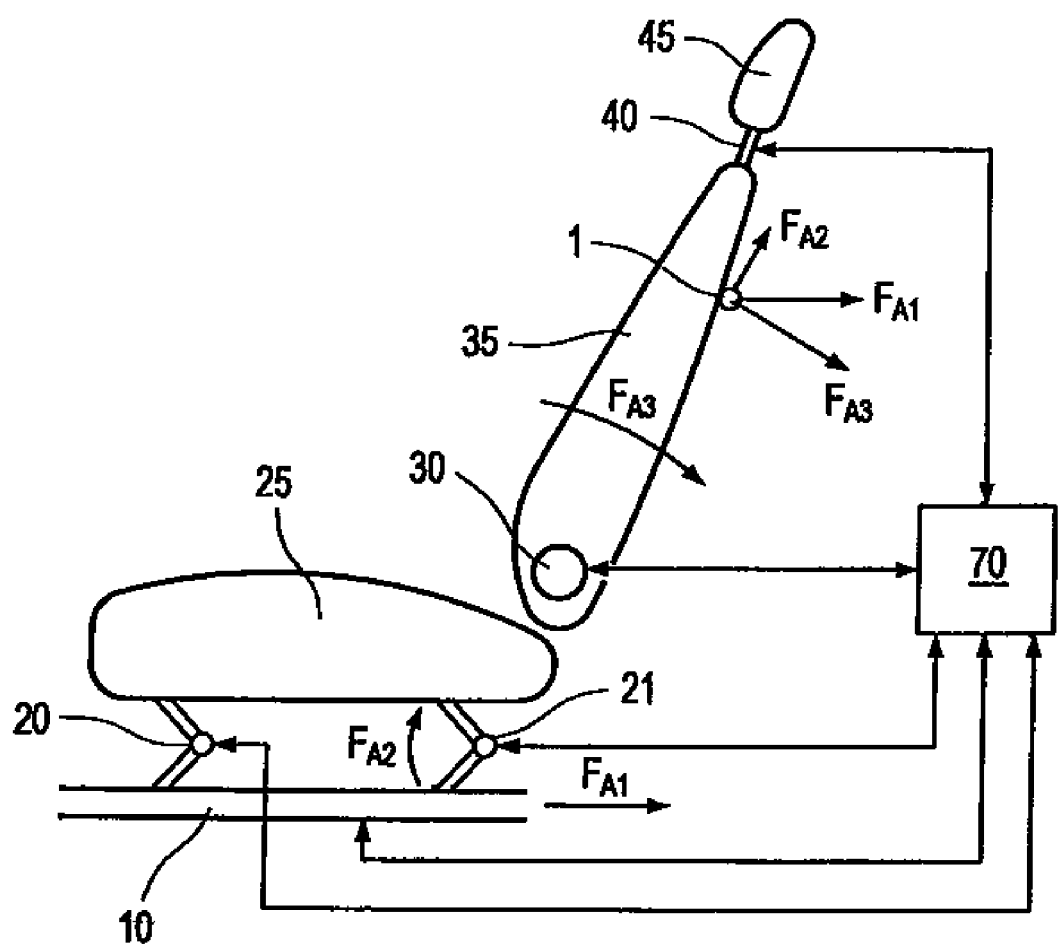
FIG. 1: a schematic two-dimensional view of a vehicle seat.

In order to achieve the first object, an adjustment device, in particular a vehicle seat is provided. This adjustment device preferably has a first drive for adjusting an adjusting part, in particular a backrest, in a first adjustment direction and a second drive for adjusting this adjustment part in a second adjustment direction. In this context, each of the adjustment directions can be made constant along a translatory adjustment or can change with an adjustment position by virtue of the fact that the adjustment part can be adjusted in a rotational fashion or in both a rotational and translatory fashion by the respective drive.

The adjustment device preferably also has an open-loop control apparatus for performing open-loop control of the first drive and of the second drive and for detecting trapping of a body part or of an object as a result of an adjustment movement of the adjustment part which can be adjusted by the first drive and by the second drive. The respective drive may be here, for example, an electromotive, hydraulic or pneumatic drive. The open-loop control apparatus advantageously has an electronic system with a control circuit for performing open-loop control of the drives.

The adjustment device preferably has a first sensor means which is operatively connected to the first drive, and a second sensor means which is operatively connected to the second drive. A sensor means may be, for example a Hall sensor or a current-measuring resistor (shunt). The open-loop control apparatus is advantageously connected to the first sensor means and to the second sensor means. In addition, the control device is preferably configured and designed to determine, as a function of a first sensor signal of the first sensor means and a second sensor signal of the second sensor means, a first force variable, which is dependent on the adjustment movement, and a second force variable, which is dependent on the adjustment movement. The first or second force variable may be a force which is actually acting, in particular a force vector or a characteristic variable which correlates with the force or the force vector. For example, the force variable is a value which is proportional to a force, or the force variable is a value which is a mathematical relationship (for example a product) of a mechanical characteristic variable, such as a position-dependent transmission ratio, and a force. For the first and second force variables, a force absolute value and a direction of the acting force, that is to say force vector, are preferably determined and preferably buffered in a memory for the current adjustment position and/or a number of adjustment positions covered by the adjustment movement.

In order to determine the direction of the first or second force vectors it is advantageously possible to evaluate at least one current adjustment position which has been set by the first drive and/or the second drive.

The open-loop control apparatus is configured to detect the trapping by means of a combined evaluation of at least the first force variable and the second force variable. The combined evaluation is advantageously carried out by comparing the first force variable and the second force variable in terms of amplitude and/or change in amplitude over time and/or in relation to position with parameters which have been determined or predefined. The comparison is preferably carried out here simultaneously. For example, a first force vector and a second force vector can, as force variables, each be multiplied by a parameter and subsequently added vectorially. For example, the profile of the sum is differentiated over time and the derivative compared with a threshold value. In addition to this combined evaluation of a first force vector and of a second force vector which has been explained by way of example, a large number of combined evaluations are additionally possible, which evaluations are to be adapted to the type of the respective adjustment (backrest, inclination of the seat, longitudinal adjustment etc.), to the drives used and to an adjustment mechanism (of the seat).

In one advantageous development, the adjustment device and an adjustment mechanism thereof are embodied in such a way that a trapping force which acts with respect to the adjustment movement has a reaction both on the first drive and on the second drive.

The second object is achieved by means of an open-loop control apparatus of an adjustment device of a vehicle. The open-loop control apparatus preferably serves to perform open-loop control of a first drive and of a second drive and to detect trapping of a body part or of an object which are trapped as a result of an adjustment movement of an adjustment part of the adjustment device, which adjustment part can be adjusted in a first adjustment direction by the first drive and in a second adjustment direction by the second drive. In this context, the open-loop control apparatus is advantageously configured to detect the trapping by means of a combined evaluation of at least a first force variable, which is dependent on the adjustment movement, in particular a force vector, and a second force variable, which is dependent on the adjustment movement, in particular a force vector.

The open-control apparatus preferably has an electronic circuit with a computing unit which carries out computational evaluation of the measurement data in order to detect a case of trapping. In addition, a number of parameters (i.e. one or more) are used for the evaluation, and, in order to determine a parameter it is possible for it to be measured, calculated or predefined. Such a parameter is, for example, the difficulty of movement of the adjustment by one of the drives as a function of the adjustment position, the weight of the vehicle occupant on the seat, mechanical and/or geometric peripheral conditions such as lever arms or the like.

There is advantageously provision here for the first adjustment direction to be implemented in the same direction as the second adjustment direction in certain sections or over an entire adjustment path. For example, both drives of the seat height adjustment means adjust the seat bucket in the same direction. Another exemplary embodiment provides for a window pane to be adjusted in the same direction at least in certain sections by the first drive and the second drive so that in this example also the first adjustment direction and the second adjustment direction are at least identical over part of the adjustment path.

In one advantageous development of the invention there is provision for the open-loop control apparatus to be configured and designed to perform closed-loop control of a drive torque and/or of a drive speed of the first drive with the first closed-loop controller, and/or to perform closed-loop control of a drive torque and/or of a drive speed of the second drive with a second closed-loop controller. Although in principle an analogue closed-loop controller (PI, PD, PD controller) is also possible, the closed-loop control is, however, preferably carried out by means of a digital algorithm, in particular using a computing unit, for example a microcontroller.

A signal within an analogue or digital closed-loop control circuit is an actuation signal. The open-loop control apparatus is therefore preferably configured and designed to detect the first force variable and/or the second force variable as a function of a first actuation signal of a first closed-loop controller of the first drive and/or of a second actuation signal of a second closed-loop controller of the second drive.

According to one advantageous embodiment, the open-loop control apparatus has a first sensor means for detecting a first adjustment position and/or a first adjustment speed and/or a first drive current and a second sensor means for detecting a second adjustment position and/or a second adjustment speed and/or a second drive current. Such a sensor means is, for example, an ohmic, optical and/or magnetic sensor which is operatively connected to the drive current of the first and/or second drive or to a drive shaft of the first and/or second drive. For example, a ripple of the drive current (current ripple) can be evaluated in order to detect the adjustment position and/or the adjustment speed.

The third object is achieved for means of a method for detecting trapping of a body part or of an object as a result of an adjustment movement of an adjustment part of a vehicle. The adjustment part can preferably be adjusted in a first adjustment direction by a first drive and in a second adjustment direction by a second drive.

The trapping is preferably detected by a combined evaluation of at least a first force variable—in particular a force vector—which is dependent on the adjustment movement, and a second force variable—in particular a force vector—which is dependent on the adjustment movement. In this context, the first force variable and the second force variable are advantageously continuously updated. The first force variable is advantageously determined simultaneously with a determination of the second force variable, or offset slightly in terms of time (for example directly subsequent to it), in such a way that the first force variable and the second force variable can be assigned to one another with a precision in terms of a current adjustment position and/or a current adjustment time which is sufficient to detect the case of trapping.

In one preferred development there is provision that a first force variable and/or a second force variable are detected as a function of a first drive torque of the first drive and/or of a second drive torque of the second drive. The drive torque may, for example, be measured directly. Alternatively, the drive torque is preferably determined from the rotational speed and a characteristic curve which is determined for the drive. From the assignment to the drive it then becomes possible to determine a direction of the force variables so that, in particular, force vectors are determined as force variables and combined.

According to one refinement, the first force variable and/or the second force variable are determined as a function of a first adjustment speed of the first drive and/or a second adjustment speed of the second drive. The first force variable and/or the second force variable are advantageously determined as a function of a first value of a derivative of the adjustment speed of the first drive over time or distance and/or of a second value of a derivative of the adjustment speed of the second drive over time or distance.

Closed-loop control of the speed and/or of the torque of the first drive and/or the second drive is advantageously carried out in the closed-loop control loop. An actuation signal of the closed-loop control loop is advantageously converted into a pulse-modulated signal which performs pulse-width modulation on a drive current of the first drive and/or of the second drive. According to one advantageous development, the first force variable and/or the second force variable are determined as a function of a first actuation signal of a first closed-loop controller of the first drive and/or of a second actuation signal of a second closed-loop controller of the second drive.

In order, in particular, to determine a direction of the first force variable and/or the second force variable and therefore to take into account force vectors as force variables, there is, in one preferred development, provision that the first force variable and/or the second force variable are detected as a function of a first current adjustment position of the first drive and/or of a second current adjustment position of the second drive.

In order to detect a case of trapping, there is, according to one preferred development, provision that the first drive and the second drive are adjusted simultaneously at least in certain sections. For this purpose, for example an open-loop control apparatus performs open-loop control simultaneously on a first power driver (power transistor), which is connected to the first drive, and on a second power driver (power transistor), which is connected to the second drive, in order to energize the first drive and the second drive.

The first drive and the second drive can advantageously be actuated here in such a way that the force variables such as force vectors for a trapped object are added vectorally. Alternatively, it is, of course, also possible to actuate the drives in such a way that the first force variable and the second force variable, in particular the force vectors, change differently with respect to the trapped object so that, for example, the trapping event leads simultaneously to a reduction in a first absolute value of the first force variable and to an increase in a second absolute value of the second force variable.

During the simultaneous adjustment, a change in the first force variable and in the second force variable which acts simultaneously on the first drive and the second drive is detected as a case of trapping. Subsequently, the adjustment movement of the first drive and/or of the second drive is stopped. In addition, the trapped object can subsequently be released again by virtue of the first that the adjustment movement occurs in the opposite direction by reversing the drive direction of the first drive and/or of the second drive for a minimum time period which is predefined by way of example.

In one preferred development there is provision that a trapping region is detected from a first current adjustment position of the first drive and/or a current adjustment position of the second drive and a ratio between the first force variable and the second force variable. In an ideal case, a trapping on a structure of the adjustment device, for example on a backrest structure of the vehicle seat, could be determined with precise resolution.

Such a method can be applied, in particular, to a window lifting system in which the window pane is moved by means of two separate drives or by means of two separate drivers. It is possible to determine the trapping location along the closing edge of the window pane from the force distribution along the drivers or along the drives, which can be acquired, for example, by means of sensors or can be derived from the rotational speed or the drive torque. This is achieved by means of a simple force parallelogram. The same applies in particular also to electrically driven tailgates which have a separate drive, or at least separate drive elements, on each side. Once the trapping region or trapping location has been determined, the reaction of the case of trapping on the drives can be successfully determined with precision. As a result, limiting values or switch off values can be calculated locally.

There is preferably also provision that open-loop control is performed on the first drive and/or on the second drive as a function of the detected trapping region, in particular as a function of the hardness of the trapping region. For example, as a function of the specific trapping region, it is possible to use different spring constants of the mechanical system for carrying out a trapping detection process. For example, in the case of a trapping region which is very soft due to upholstery, a rise in force (with respect to the adjustment travel which is carried out) which is significantly flatter than in the case of a hard trapping region is taken into account in a case of trapping.

FIG. 1 shows a schematic two-dimensional view of a vehicle seat which has a drive 10 for a seat longitudinal adjustment means, two drives 20 and 21 for a height adjustment means and an angle of inclination adjustment means for a seat bucket 25, a drive 30 for adjusting a backrest angle of inclination of a seat backrest 35 and a drive 40 for adjusting a headrest 45. The seat longitudinal adjustment means and the headrest adjustment means are translatory in the exemplary embodiment in FIG. 1. The seat height adjustment means and the backrest angle of inclination adjustment means are, on the other hand rotational in the exemplary embodiment in FIG. 1.

The drives 10, 20, 21, 30 and 40 have electric motors which are connected to an open-loop control apparatus 70 for performing open-loop control of the energization of the electric motors with cables. Furthermore, the drives 10, 20, 21, 30 and 40 each have at least one sensor (not illustrated in FIG. 1) which is also electrically or optically connected to the open-loop control apparatus 70. These connections between the drives 10, 20, 21, 30 and 40 and the open-loop control apparatus 70 are indicated schematically by double arrows.

By means of a respective sensor signal of the sensors of the drives 10, 20, 21, 30, 40, the open-loop control apparatus 70 determines an adjustment position of each drive 10, 20, 21, 30, 40 and a position of adjustment parts 25, 35, 45 such as seat bucket 25, backrest 35 or headrest 45. By means of additional drives (not illustrated in FIG. 1), dimensions (seat depth, backrest height) of the adjustment parts 25, 35 can also be changed and determined by means of the open-loop control apparatus 70.

The open-loop control apparatus 70 determines force vectors $F_{A1}$, $F_{A2}$, $F_{A3}$ from an adjustment position, a rotational speed of a drive 10, 21, 30 and further parameters such as, for example, a transmission ratio. Each force vector $F_{A1}$, $F_{A2}$, $F_{A3}$, is assigned to one of the drives 10, 21, 30. In the exemplary embodiment in FIG. 1, the open-loop control apparatus 70 determines a case of trapping at the trapping point 1 by means of a vectorial addition of the force vectors $F_{A1}$, $F_{A2}$, $F_{A3}$. Each force vector $F_{A1}$, $F_{A2}$, $F_{A3}$, can be weighted differently here as a function of the geometry of the seat by means of a weighting factor when the case of trapping is detected.

Figure 2:
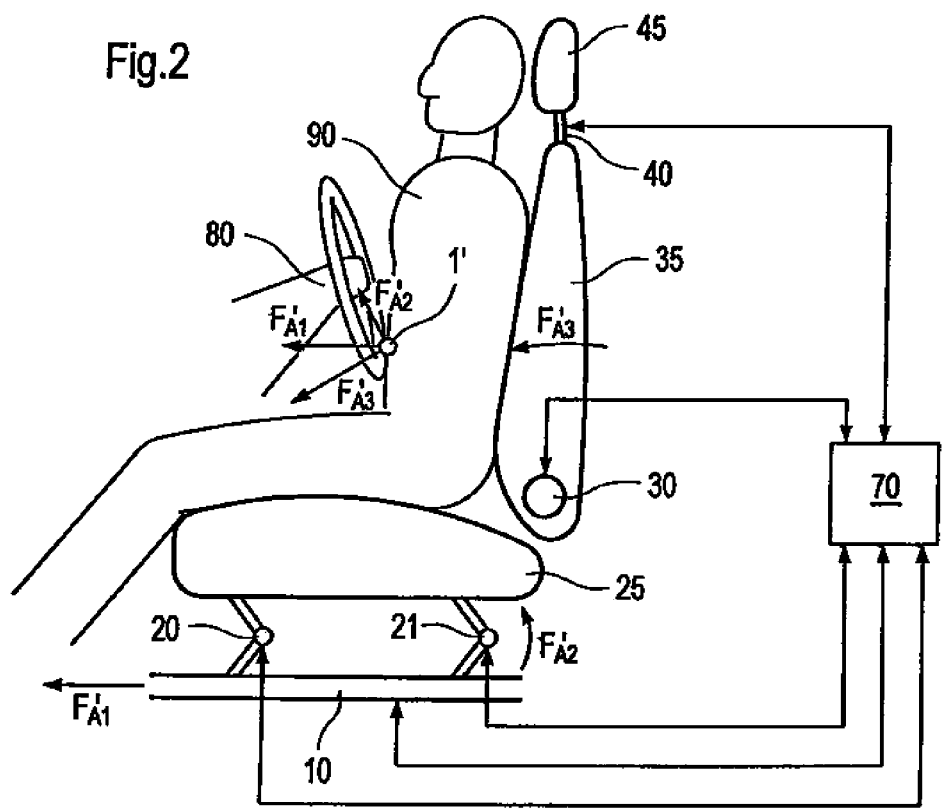
FIG. 2: a schematic two-dimension view of a vehicle seat with a person sitting on it.

FIG. 2 illustrates a further trapping situation in a schematic, two-dimensional view. The driver 90 is trapped between a steering wheel 80 and the backrest 35 of the vehicle seat as a result of automatic adjustment owing to activation of a memory key of the vehicle seat. The open-loop control apparatus 70 in turn determines the force vectors $F_{A1}$, $F_{A2}$, and $F_{A3}$ at the trapping point 1'.

Figure 3:
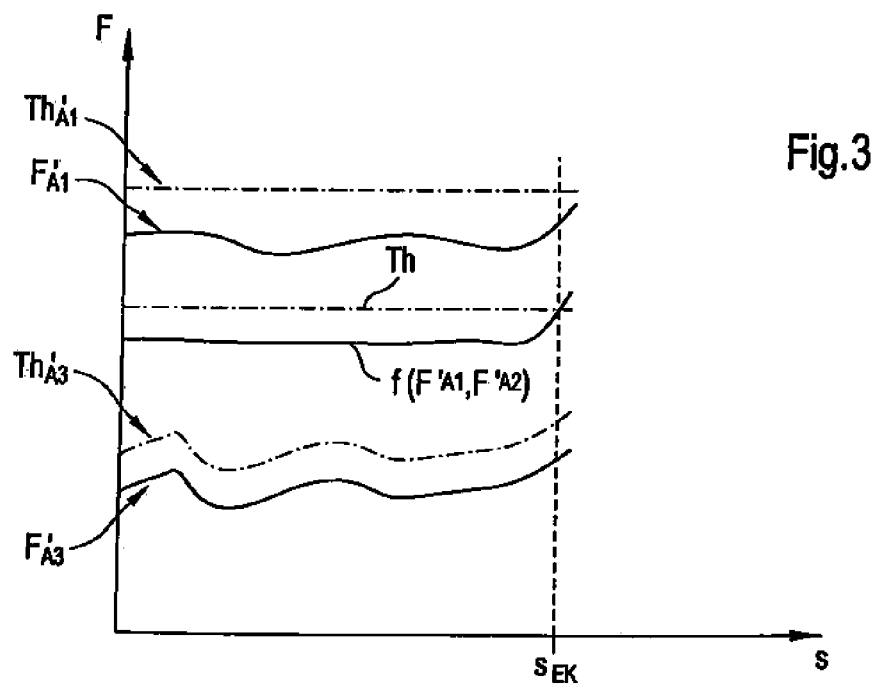
FIG. 3: is a schematic diagram with measured values for two force vectors.

A schematic diagram of the case of trapping in FIG. 2 is given in FIG. 3. For the sake of simplified illustration, only the force vector $F_{A1'}$ of the seat longitudinal adjustment drive 10 and the force vector $F_{A3'}$ of the backrest angle of inclination adjustment drive 30 for the case of trapping are explained in more detail in the diagram in FIG. 3. A threshold $Th_{A1'}$ is assigned to the force vector $F_{A1'}$ of the seat longitudinal adjustment drive 10. If this threshold $Th_{A1'}$ is exceeded by the absolute value F of the force vector $F_{A1'}$ of the seat longitudinal adjustment drive 10, this drive 10 is stopped or reversed. However, this threshold $F_{A1'}$ is not exceeded in FIG. 3.

The same applies to the force vector $F_{A3'}$. A threshold $Th_{A3'}$ is assigned to the force vector $F_{A3'}$ of the backrest angle of inclination adjustment drive 30. The threshold $Th_{A3'}$ is dependent on determined difficulties of movement of the backrest. If this threshold $Th_{A3'}$ is exceeded by the absolute value F of the force vector $F_{A3'}$ of the backrest angle of inclination adjustment drive 30, this drive 30 is stopped or reversed. However, this threshold $Th_{A3'}$ is not exceeded in FIG. 3.

Furthermore, FIG. 3 is a diagram showing a profile of a function f ($F_{A1'}$, $F_{A3'}$) along the adjustment path s, which is compared with the threshold Th. The function f($F_{A1'}$, $F_{A3'}$) is, for example, a cross correlation of the force vectors $F_{A1'}$ and $F_{A3'}$. Owing to the case of trapping, the absolute value F of the two force vectors $F_{A1'}$ and $F_{A3'}$ increases simultaneously. This simultaneous increase can be determined by means of the cross correlation and compared with the threshold Th for the purpose of the decision. For this reason, a case of trapping is detected at an adjustment position $S_{EK}$ in FIG. 3.

What is claimed is:

1. An adjustment device in a motor vehicle, the adjustment device comprising
   a first drive for adjusting an adjustment part, in a first adjustment direction,
   a second drive for adjusting this adjustment part in a second adjustment direction,
   an open-loop control apparatus for performing open-loop control of the first drive and of the second drive and for detecting trapping of a body part or of an object as a result of an adjustment movement of the adjustment part which can be adjusted by the first drive and by the second drive,
   a first sensor means which is operatively connected to the first drive, and
   a second sensor means which is operatively connected to the second drive,
   wherein the open-loop control apparatus is connected to the first sensor means and to the second sensor means and is configured and designed to determine, as a function of a first sensor signal of the first sensor means and a second sensor signal of the second sensor means, a first force variable, which is dependent on the adjustment movement, and a second force variable, which is dependent on the adjustment movement, and to detect the trapping by means of a combined evaluation of at least the first force variable and the second force variable.

2. The adjustment device according to claim 1, in which a trapping force which acts with respect to the adjustment movement has a reaction both on the first drive and on the second drive.

3. An open-loop control apparatus of an adjustment device for performing open-loop control of a first drive and of a second drive and for detecting trapping of a body part or of an object as a result of an adjustment movement of an adjustment part of the vehicle seat, which adjustment part can be adjusted in a first adjustment direction by the first drive and in a second adjustment direction by the second drive,
   wherein the open-loop control apparatus is configured to detect the trapping by means of a combined evaluation of at least
   a first force variable, which is dependent on the adjustment movement in the first adjustment direction, and
   a second force variable, which is dependent on the adjustment movement in the second adjustment direction.

4. The open-loop control apparatus according to claim 3, wherein the open-loop control apparatus is configured
   to perform closed-loop control of a drive torque and/or of a drive speed of the first drive with the first closed-loop controller and/or to perform closed-loop control of a drive torque and/or of a drive speed of the drive with a second closed-loop controller, and
   to detect the first force variable and/or the second force variable as a function of a first actuation signal of a first closed-loop controller of the first drive and/or of a second actuation signal of a second closed-loop controller of the second drive.

5. The open-loop control apparatus according to any of claims 1-4, wherein the open-loop control apparatus has a first sensor means for detecting a first adjustment position and/or a first adjustment speed and/or a first drive current of the first drive and a second sensor means for detecting a second adjustment position and/or a second adjustment speed and/or a second drive current of the second drive.

6. A method for detecting trapping of a body part or of an object as a result of an adjustment movement of an adjustment part of an adjustment device of a motor vehicle, which adjustment part can be adjusted in a first adjustment direction by a first drive and in a second adjustment direction by a second drive,
   in which method the trapping is detected by a combined evaluation of at least
   a first force variable, which is dependent on the adjustment movement in the first adjustment direction, and
   a second force variable, which is dependent on the adjustment movement in the second adjustment direction.

7. The method according to claim 6, in which the first force variable and/or the second force variable are detected as a function of a first drive torque of the first drive and/or of a second drive torque of the second drive.

8. The method according to claim 6, in which the first force variable and/or the second force variable are detected as a function of a first adjustment speed of the first drive and/or of a second adjustment speed of the second drive.

9. The method according to claim 6, in which the first force variable and/or the second force variable are detected as a function of a first value of a derivative of an adjustment speed of the first drive over time or distance and/or of a second value of a derivative of an adjustment speed of the second drive over time or distance.

10. The method according to claim 6, in which the first force variable and/or the second force variable are detected as a function of a first actuation signal of a first closed-loop controller of the first drive and/or of a second actuation signal of a second closed-loop controller of the second drive.

11. The method according to claim 6, in which the first force variable and/or the second force variable are detected as a function of a first current adjustment position of the first drive and/or a second current adjustment position of the second drive.

12. The method according to claim 6, in which the first drive and the second drive are adjusted simultaneously at least in certain sections.

13. The method as claimed in claim 12, in which, during the simultaneous adjustment, a change in the first force variable and in the second force variable which acts simultaneously on the first drive and on the second drive is detected as a case of trapping.

14. The method as claimed in claim 6, in which a trapping region is detected from a first current adjustment position of the first drive and/or a current adjustment position of the second drive and a ratio between the first force variable and the second force variable.

15. The method as claimed in claim 14, in which open-loop control is performed on the first drive and/or on the second drive as a function of the detected trapping region, in particular as a function of the hardness of the trapping region.

16. The adjustment device according to claim 1, wherein the adjustment part is a backrest.

17. The adjustment device according to claim 1, wherein the adjustment part is a window pane.

* * * * *